(12) United States Patent
Stewart et al.

(10) Patent No.: US 11,693,404 B2
(45) Date of Patent: Jul. 4, 2023

(54) TRUSTED AUTONOMY FRAMEWORK FOR UNMANNED AERIAL SYSTEMS

(71) Applicant: GE Aviation Systems LLC, Grand Rapids, MI (US)

(72) Inventors: Ken Harold Stewart, Somerville, MA (US); Vijay S. Malik, Groton, MA (US); Michael Joseph Kuhlman, Malden, MA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 281 days.

(21) Appl. No.: 17/077,335

(22) Filed: Oct. 22, 2020

(65) Prior Publication Data

US 2022/0128990 A1  Apr. 28, 2022

(51) Int. Cl.
  *G05D 1/00* (2006.01)
  *G06F 16/28* (2019.01)
  *B64C 39/02* (2023.01)
  *G08G 5/00* (2006.01)

(52) U.S. Cl.
  CPC ......... *G05D 1/0027* (2013.01); *B64C 39/024* (2013.01); *G05D 1/0022* (2013.01); *G06F 16/288* (2019.01); *G08G 5/0043* (2013.01); *B64U 2201/10* (2023.01); *B64U 2201/20* (2023.01)

(58) Field of Classification Search
  CPC ...... G05D 1/0027; G05D 1/0022; G05D 1/00; B64C 39/024; B64C 2201/141; B64C 2201/146; B64C 39/02; G06F 16/288; G06F 21/60; G06F 21/30; G08G 5/0043; G08G 5/00; G06Q 10/063; G06Q 10/08; G06Q 30/018; G06Q 50/28

See application file for complete search history.

(56) References Cited

U.S. PATENT DOCUMENTS

| | | |
|---|---|---|
| 6,338,011 B1 | 1/2002 | Furst et al. |
| 7,747,382 B2 | 6/2010 | Small et al. |
| 8,886,459 B2 | 11/2014 | Stefani et al. |
| 9,105,184 B2 | 8/2015 | Stefani et al. |
| 9,527,587 B2 | 12/2016 | Levien et al. |
| 10,310,920 B2 | 6/2019 | Briand |
| 10,339,818 B2 | 7/2019 | Ziemba et al. |

(Continued)

FOREIGN PATENT DOCUMENTS

| | | | |
|---|---|---|---|
| WO | WO-2012120313 A1 * | 9/2012 | ........... G06F 21/602 |
| WO | WO-2015102714 A2 * | 7/2015 | ............. G06F 21/00 |

OTHER PUBLICATIONS

Extended European Search Report for EP Application No. 21202402.0 dated Mar. 18, 2022 (7 pages).

*Primary Examiner* — Yonel Beaulieu
(74) *Attorney, Agent, or Firm* — Dinsmore & Shohl, LLP

(57) ABSTRACT

Disclosed herein are embodiments for providing a trusted autonomy framework for unmanned aerial systems. One embodiment of a method includes receiving a request from an entity to participate in secure data sharing within the trusted autonomy framework for unmanned aerial systems, receiving a type of data that will be shared via the entity, and verifying an identity of the entity, a security infrastructure of the entity, and validating the data to be shared. In some embodiments, in response to verifying, accepting the entity into the trusted autonomy framework for unmanned aerial systems.

20 Claims, 7 Drawing Sheets

(56) References Cited

U.S. PATENT DOCUMENTS

| | | | |
|---|---|---|---|
| 2008/0005798 A1* | 1/2008 | Ross | H04L 63/08 726/26 |
| 2014/0380425 A1* | 12/2014 | Lockett | G06F 21/00 726/4 |
| 2018/0351941 A1 | 12/2018 | Chhabra | |
| 2019/0087593 A1 | 3/2019 | Lemmey et al. | |
| 2019/0306757 A1 | 10/2019 | Husain et al. | |
| 2020/0244466 A1 | 7/2020 | Way et al. | |
| 2022/0128990 A1* | 4/2022 | Stewart | G05D 1/0022 |
| 2022/0272084 A1* | 8/2022 | Hyatt | H04W 12/12 |

* cited by examiner

TRUSTED AUTONOMY FRAMEWORK FOR UNMANNED AERIAL SYSTEMS

FIELD

The present disclosure relates to devices, systems, methods, and non-transitory computer-readable mediums for providing a trusted autonomy framework for unmanned aerial systems, and more specifically, for creating a federated infrastructure for communicating data among aerial components.

BACKGROUND

As technology advances, small unmanned aerial systems (sUAS) are being utilized more frequently in a variety of contexts. As an example, parcel delivery is being handled by large retailers for delivering parcels to consumers at a delivery address. As these and other personal and commercial use of sUAS are increased, the usage of a finite amount of airspace will also increase, thus requiring sharing of the airspace, as well as communication of data to ensure problem free use of this airspace.

Commercial sUAS operations often utilize significant ancillary data to enable effective use of the technology. Organizations that utilize the sUAS often share private data to support sUAS operations. Additionally, there is currently no industry guidance or standards for how this data is shared for error-free sUAS operations. Specifically, USS-USS standards do not consider how ancillary data (such as essential business data) is shared between trusted entities to make sUAS operations commercially viable. In addition, there is no current framework for verifying people who can access sensitive data. For example, pilots should have their Part 107 certifications verified by the FAA. There is also no means of establishing whether or not a user is in fact a first responder and should be given first responder permissions/authority (e.g. should be permitted to fly during disaster scenarios). There is no way to verify vehicle information. As such, there is a need for a trusted autonomy framework for unmanned aerial systems.

SUMMARY

Disclosed herein are embodiments for providing a trusted autonomy framework for unmanned aerial systems. One embodiment of a method includes receiving a request from an entity to participate in secure data sharing within the trusted autonomy framework for unmanned aerial systems, receiving a type of data that will be shared via the entity, and verifying an identity of the entity, a security infrastructure of the entity, and validating the data to be shared. In some embodiments, in response to verifying, accepting the entity into the trusted autonomy framework for unmanned aerial systems.

In an embodiment, a system includes a computing device that includes a processor and a memory component, the memory component storing logic that, when executed by the processor causes the system to receive a request from an entity to participate in secure data sharing within the trusted autonomy framework for unmanned aerial systems, receive a type of data that will be shared via the entity, and verify an identity of the entity, a security infrastructure of the entity. In some embodiments, the system is configured to validate the data to be shared and in response to verifying, accept the entity into the trusted autonomy framework for unmanned aerial systems, wherein upon acceptance into the trusted autonomy framework, the entity may communicate with other entities that have been previously accepted into the trusted autonomy framework.

In an embodiment, a non-transitory computer-readable medium includes logic for execution by a computing device, the logic configured to cause the computing device to receive a request from an entity to participate in secure data sharing within the trusted autonomy framework for unmanned aerial systems, receive a type of data that will be shared via the entity, verify an identity of the entity and a security infrastructure of the entity. In some embodiments, in response to verifying, accept the entity into the trusted autonomy framework for unmanned aerial systems, wherein upon acceptance into the trusted autonomy framework, the entity may communicate with other entities that have been previously accepted into the trusted autonomy framework.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
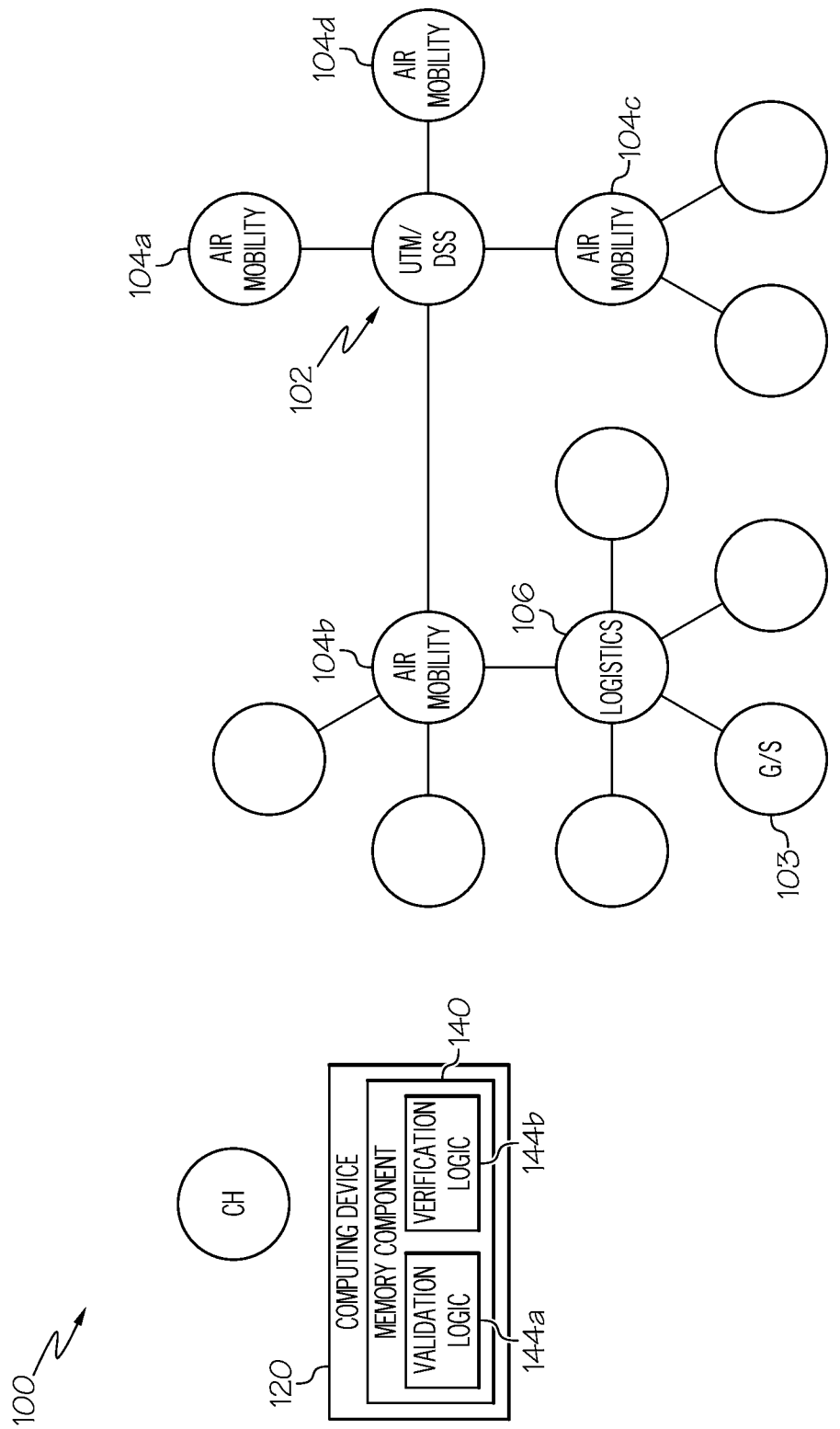
FIG. 1 schematically depicts a federated trusted autonomy framework, according to one or more embodiments shown and described herein.

The present disclosure generally relates to devices, systems, and methods for providing a trusted autonomy framework for unmanned aerial systems. The devices, systems, and methods described herein may be configured to establish data sharing between trusted parties. In some embodiments, the parties may agree upon a type of data to be shared, how it can be shared with others, and how to verify its authenticity. Trusted parties can be other sUAS operator(s) or other types of data providers that need to be ingested or forwarded for safe sUAS operations. These embodiments create a standard for sharing ancillary business data to support UTM operations, as well as establish the requirements for agents to be considered trusted in data transactions, thereby reduces costs for establishing data agreements between parties.

Thus, embodiments described herein outline a standardized process in which trusted data links are established to share information between parties. Organizations wishing to create a trusted data link in the trusted autonomy framework enter into a specific agreement regarding the type of data to be shared, data requirements, including security, protection, retention, location, etc., with whom can the data be shared, what data can be shared, and how to ensure the authenticity of the data. In addition to the agreement, organizations and people may be onboarded via industry available vetting methods. In these embodiments, query may be sent regarding an authoritative UAS operators list before a pilot can be granted access to the framework. In addition, any certifications an organization has (ISO certification, SOC2 compliance, FedRAMP certification, GDPR compliance, being an approved USS for providing LAANC services, etc.) are established/confirmed at onboarding and are updated as needed.

Such data agreements can be written to share only public/safety critical information with competitors or untrusted organizations in such cases where data is voluminous. These data agreements can also establish the need to maintain compliance with various regulations or standards (e.g. General Data Protection Regulations, data location requirements, data sovereignty requirements, NIST FIPs 199 compliance). Such requirements transfer to other trusted parties intending to access the information.

Data can be transmitted between other organizations not in the original data agreement so long as it adheres to the data sharing policy, which may be established by a clearinghouse. This enables the requisite data for making a drone operation successful while minimizing the number of data agreements to be signed. When data is shared between two parties, tokens generated by the clearinghouse ensure that all parties have proper scope. A party has proper scope if they have an agreement in place or are granted permission to receive the information from others, they satisfy all the requirements of the agreement, and have proper certification.

In order to establish a trusted autonomy framework, users are authenticated. Entities can only hit end points and make data requests that their data agreement permits. Depending on how parties intend to share their information with others, the system can be deployed using software multitenancy explicit data sharing links that limit the scope of information communicated on the same platform. On the other hand, a company can request a private, single tenant system to isolate their information from others to maximize security.

Accordingly, embodiments of the trusted autonomy framework address the challenge of enabling users of the system to determine if vehicles in the sky (whether or not they participate in Remote ID) are "cooperative" (abiding by the operating rules), "clueless" (don't understand operating rules) or "criminal" (potential malicious intent or negligent). Companies must also maintain regulatory compliance regarding data protection and data security. A police department has very different data protection and security requirements for operating a drone than a logistics company delivering a package. Yet both must coordinate pertaining to a data agreement.

Another aspect of embodiments of the trusted autonomy framework is payment/settlement of services. Agreements between parties can also stipulate how parties receive/disburse payment through contracts, subscription services, or transaction-based costs.

Referring now to the drawings, FIG. 1 schematically depicts a federated trusted autonomy framework, according to one or more embodiments shown and described herein. As illustrated, the federated trusted autonomy framework may include a plurality of entities, such as a clearinghouse 100, a sUAS Traffic Management (UTM) and/or discovery and synchronization services (DSS) entity, air mobility entities 104a, 104b, 104c, 104d (collectively referred to as air mobility entities 104), a data/services provider 106, and/or goods and services provider 103, which fulfills product orders, but may be outside the trusted framework.

The clearinghouse 100 may be configured with one or more computing device 120, which may include a memory component 140. The memory component 140 may store validation logic 144a and verification logic 144b. As described in more detail below, the validation logic 144a may be utilized for validating data sent to the trusted autonomy framework. The verification logic 144b may be utilized for verifying an entity should be considered as a part of the trusted autonomy framework.

Specifically, the validation logic 144a may be configured to monitor communications between participates in the trusted framework. In some embodiments, the communication data may include a header that identifies the type of data sent and the recipient may respond with a trustworthiness indicator. In these embodiments, the validation logic 144a may be configured to view the type of data, and the trustworthiness indicator to determine whether the data sender should be able to maintain status as a trusted partner in the trusted framework.

In some embodiments, the validation logic 144a may actually view and/or vet the data sent to ensure that the data is trustworthy. This may include analyzing the data for malware; spot checking the data sent to ensure some level of authenticity; spot checking the data to ensure the content of the data appears accurate, spot checking to determine that the data is within a predetermined agreement, etc. As an example, if weather data is being communicated, the validation logic 144a may determine that the date and location of the data appear to coincide with the request. If the validation logic 144a determines that something is appears incorrect, some embodiments may communicate with the recipient of the data with one or more flags to indicate possible inaccuracies. If the recipient confirms the inaccuracies, the validation logic 144a may determine that the sender is untrustworthy. In some embodiments, however, the validation logic may not allow the data to be sent to the recipient, until the data accuracy is confirmed by either the sender or third party.

Also depicted in FIG. 1 is the UTM/DSS entity 102. The UTM/DSS entity is depicted to represent any entity that provides data traffic management. Specifically, UTM is a traffic management infrastructure for uncontrolled operations. UTM may be configured to identify services, roles and responsibilities, information architecture, data exchange protocols, software functions, infrastructure, and performance requirements for enabling the management of sUAS. Similarly, DSS is an entity that provides programs for strategic flow, en route flow, terminal flow and airport surface movement. Together the UTM/DSS entity 102 is depicted in FIG. 1 to represent any entity that provides regulated air traffic data, such as that described herein. The UTM/DSS entity 102 is also depicted to represent any other entity that may provide trustworthy information to the air mobility entities 104.

Also depicted in FIG. 1 are the air mobility entities 104. It should be understood that while the air mobility entities 104 may be depicted in FIG. 1 as a node, the air mobility entities 104 may include any entity, device, vehicle, or other component within the trusted network. Specifically, while air mobility entity 104a may represent a company, embodiments described herein may also refer to an air mobility entity 104 as a sUAS. As such, the air mobility entities 104 may each include one or more computing devices, sUAS, and/or other hardware, software, or firmware for executing the functionality provided herein.

Similarly, the data/services provider 106 is also depicted as a node, but may represent any entity, device, vehicle, or the like that acts as a second layer entity to the air mobility entities 104. Specifically, the data/services provider 106 may represent a logistics company that provides shipping services to a retailer, but utilizes one or more of the air mobility entities 104 for providing sUAS shipments. It will be understood that these nodes can be connected in any arbitrary fashion as prescribed by the node's respective data needs, so there could be third layers, fourth layers, other layers, and/or just a web of connections.

Additionally, while not specifically depicted in FIG. 1, the federated trusted autonomy framework may include one or more entities that may also communicate data with the other entities of FIG. 1. As an example, a weather entity, a navigation entity, and/or other entity may provide data to the air mobility entities 104, but may not be otherwise represented in FIG. 1.

In operation, an entity may be included within the trusted autonomy framework in a plurality of different ways. As an example, two entities may enter into an agreement whereby the two entities are trusted among each other for certain types of data. In this situation, once the agreement is in place, the two entities may (upon authentication of the entities) exchange data without questioning the validity of the data. As will be understood, authentication may come in any of a plurality of different forms. Additionally, some embodiments are configured to report the agreement to the clearinghouse 100. In these embodiments, the clearinghouse 100 may also be configured to authenticate the entities and ensure that the data requested and/or provided are within the agreement parameters, as data outside the agreement parameters may not necessarily be trusted, even from a trusted entity.

While in some of these embodiments, the clearinghouse 100 may act as an intermediary between two (or more) entities in verifying information, this is one example. Some embodiments are configured such that the data is received by the recipient entity, who then forwards to the clearinghouse 100 for verification. Some embodiments may be configured such that that sending entity sends to both the receiving entity and the clearinghouse 100. Still some embodiments may be configured such that the receiving entity only sends data to the clearinghouse 100 if there is a question regarding validity of the data received.

Additionally, some embodiments are configured such that the clearinghouse 100 authenticates individual entities within the trusted autonomy framework. As an example, if it is desired that the weather entity be included in the trusted autonomy framework such that all other entities in the trusted autonomy framework may receive data from the weather entity, the weather entity may submit information for acceptance into the trusted autonomy framework to the clearinghouse 100. The clearinghouse 100 may verify security, validity of information provided, and/or make other assessments to ensure that the weather entity can be included in the trusted autonomy framework and for which types of data.

As an example from FIG. 1, the air mobility entity 104b may enter into an agreement with the data/services provider 106 for providing data between the two entities. As such, the data/services provider 106 may be trusted to the air mobility entity 104a, but not to the other entities in FIG. 1. Depending on the embodiment, the clearinghouse 100 may or may not monitor communication between the air mobility entity 104a and the data/services provider 106.

Additionally, referring again to FIG. 1, all of the air mobility entities 104 may be within the trusted autonomy framework and thus may communicate with any other entity in the trusted network. The clearinghouse 100 and/or any one of the entities 102, 104 may verify that data being received is from a trusted entity and that the sender has permission to send the data.

In the context of sUAS, such a configuration may be utilized to communicate flightpath data among sUAS, weather information from a weather entity, and/or other data. This free flow of data among entities within the trusted autonomy framework ensures efficient and error free operation of each sUAS even beyond line of sight.

Figure 2:
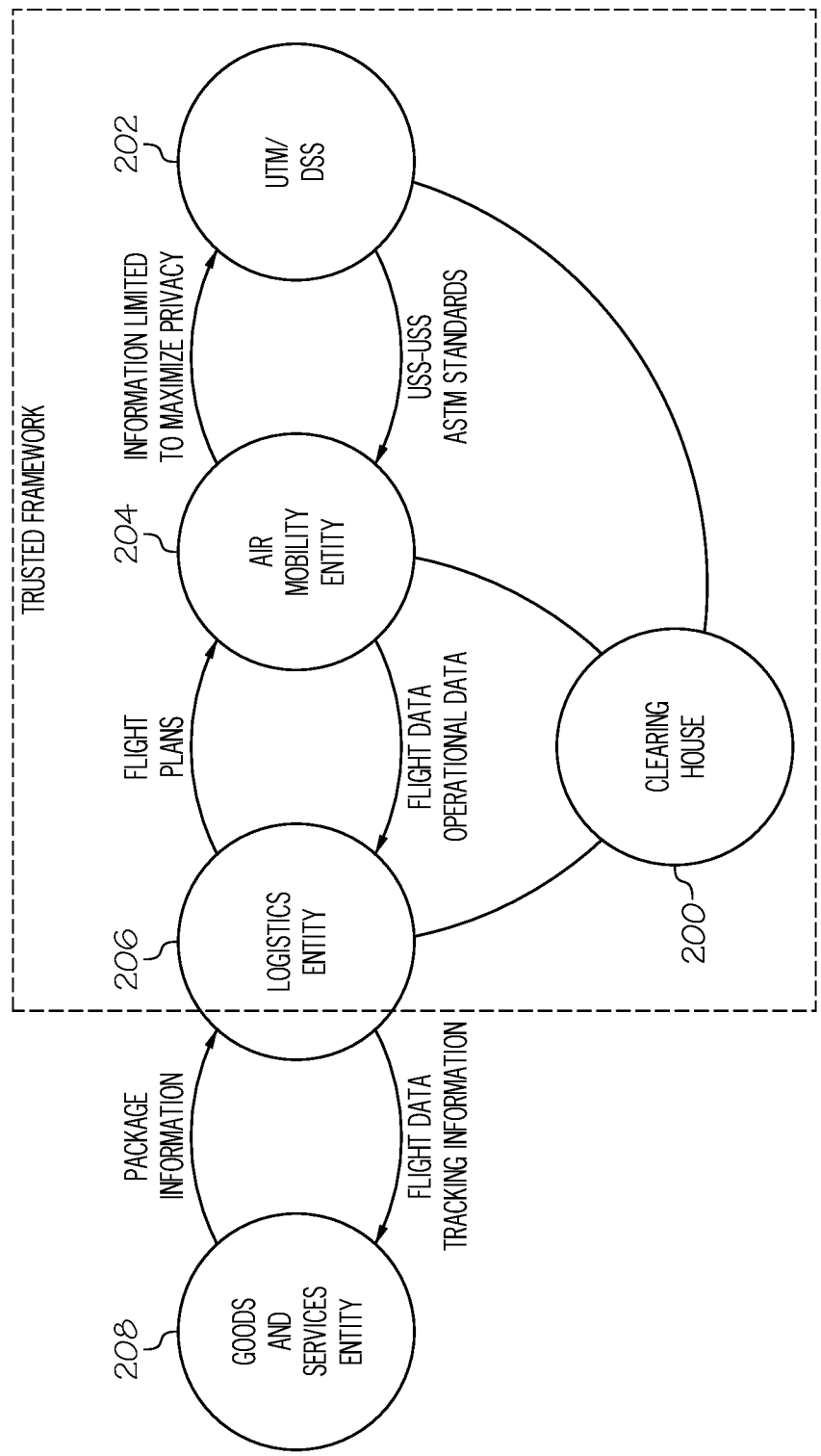
FIG. 2 schematically depicts a trusted autonomy framework for logistics workflow, according to one or more embodiments shown and described herein.

FIG. 2 schematically depicts a trusted autonomy framework for logistics workflow, according to one or more embodiments shown and described herein. As illustrated, a clearinghouse 200 may be configured to monitor entities within the trusted autonomy framework such that only entities who have been approved may enter the trusted autonomy framework; and/or that only approved entities that have been verified may communicate data and that the data is valid. Also provided in FIG. 2 are a UTM/DSS entity 202, an air mobility entity 204, a logistics entity 206, and a goods and services entity 208.

Accordingly, the goods and services entity 208 may request package information to the logistics entity 206 for a purchase made by a consumer. In order to determine where the package currently is, the logistics entity 206 may make a request within the trusted autonomy framework to the air mobility entity 204. The air mobility entity 204 may request the flight data, with information limited in scope to increase privacy. In other words, the only trusted data to be sent to other USSs (and possibly other competitors) is safety critical flight data. The scope of the trusted data is dependent on who is viewing it. The UTM/DSS entity 202 may communicate UAS service supplier (USS)-to-USS ASTM data to an air mobility entity 204.

The air mobility entity 204 may communicate flight data and operational data received from the UTM/DSS entity 202 to a logistics entity 206 that is within the trusted autonomy framework. Additionally, the logistics entity 206 may communicate the flight data with tracking information to the goods and services entity 208 that is outside the trusted network.

Depending on the embodiment, the goods and services entity 208 may have entered into an agreement with the logistics entity 206 such that communication of data is verified by the clearinghouse 200. Accordingly, goods and services entity 208 may communicate package information to the logistics entity 206 and the logistics entity 206 may communicate flight data tracking information to the goods and services entity 208. In some embodiments, the goods and services entity 208 has not entered into an agreement with the logistics entity 206 or otherwise is not monitored by the clearinghouse 200 (e.g. the data agreement is external to the trusted autonomy framework in a "legacy" agreement that predates the trusted framework).

Figure 3:
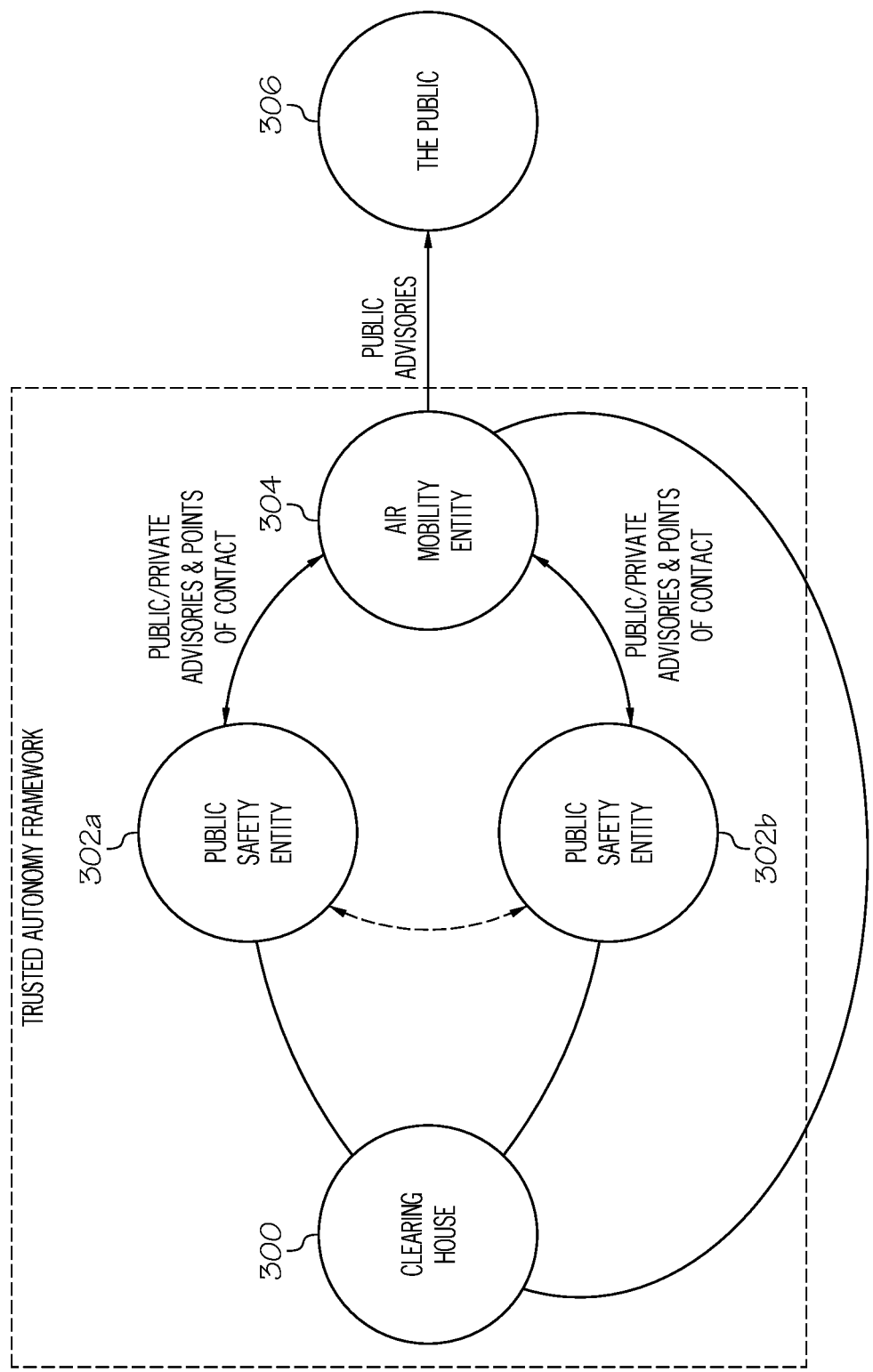
FIG. 3 schematically depicts a trusted autonomy framework for a first responder, according to one or more embodiments shown and described herein.

FIG. 3 schematically depicts a trusted autonomy framework for a first responder, according to one or more embodiments shown and described herein. As illustrated, a public safety entity 302a, a public safety entity 302b, and an air mobility entity 304 are included in the trusted autonomy framework. Accordingly, the air mobility entity 304 may communicate public or private advisories and points of contact bi-directionally with the public safety entity 302a and the public safety entity 302b. In this example, the system has rules that assign specific data a different scope specifying who can access. As these three entities are all within the trusted network, this communication may be substantially free flowing (but in some embodiments subject to oversight by the clearinghouse 300. However, the public safety entity 302a and the public safety entity 302b are not within the trusted autonomy framework with respect to the data they might send each other (e.g., air mobility enabled inter-organization communications). As such, these communications are not afforded the deference to validation or verification as communications within the trusted autonomy framework. Similarly, when the air mobility entity 304 communicates with a public entity 306, the data provided would be outside the trusted autonomy framework.

Figure 4:
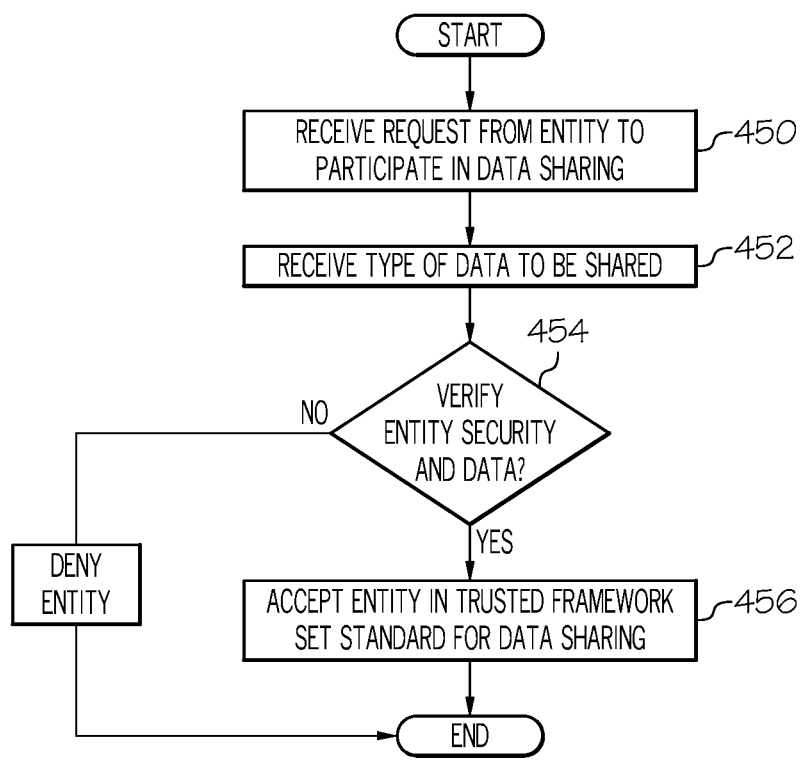
FIG. 4 depicts a flowchart for accepting an entity into a trusted autonomy framework, according to one or more embodiments shown and described herein.

FIG. 4 depicts a flowchart for accepting an entity into a trusted autonomy framework, according to one or more embodiments shown and described herein. As illustrated in block 450, a request may be received (such as by a clearinghouse) from an entity to participate in data sharing as part of a trusted autonomy framework for unmanned aerial systems. In block 452, the type of data that will be shared (unidirectional and/or bi-directional) may be received. In block 454, a determination may be made regarding whether the identity of the entity making the request, the security infrastructure of the entity, and the data to be shared by the entity is verified. If not, in block 456, the entity may be denied access to the trusted autonomy framework. If the request is verified at block 454, the entity may be accepted into the trusted autonomy framework and a standard for data sharing may be established.

Figure 5:
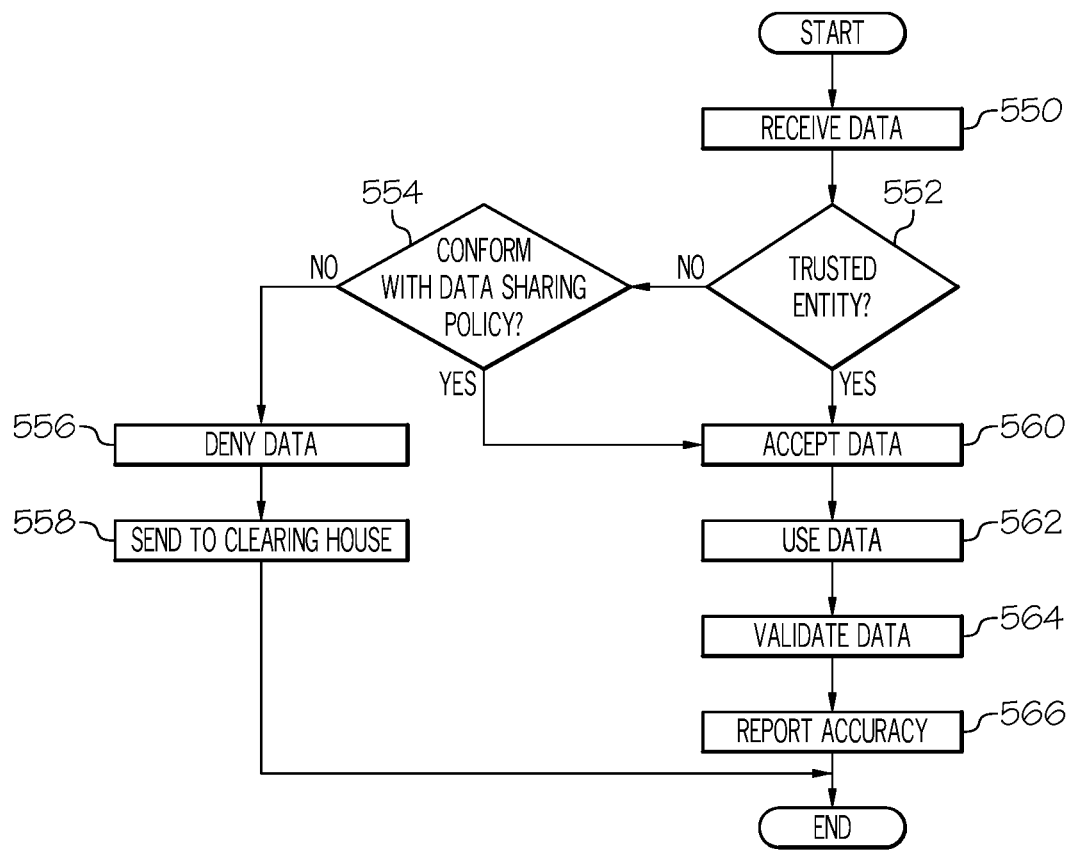
FIG. 5 depicts, a flowchart for verifying data in a trusted autonomy framework, according to one or more embodiments shown and described.

FIG. 5 depicts a flowchart for verifying data in a trusted autonomy framework, according to one or more embodiments shown and described. As illustrated in block 550, data may be received from a sending entity to a previously accepted entity into the trusted autonomy framework. In block 552, a determination may be made regarding whether the data from who the data was received is a trusted entity. If not, at block 554, a determination is made regarding whether the shared data conforms to a previously established data sharing policy. The data sharing policy may be a policy established by the clearinghouse and/or by a particular entity for data and or sending entities that are outside the trusted autonomy framework. This sharing policy may evaluate information regarding who is producing the data, information about who is requesting the data, and information about the type of data being requested to determine if data is permitted to be shared. If the data does not conform, the data is denied at block 556. In some embodiments, data sharing policies between trusted entities may be employed, where the scope of the trusted data varies with each entity. In block 558, information related to the request and denial may be sent to the clearinghouse 100.

If the data does conform to the data sharing policy or at block 552, the sending entity is a trusted entity; the data may be accepted at 560. At block 562, the data may be utilized by the receiving entity. At block 564, the data may be verified by the receiving entity and/or the clearinghouse. At block 566, an accuracy statistic of the data may be reported to ensure both members of the trusted autonomy framework and those outside the trusted network are communicating accurate data.

Figure 6:
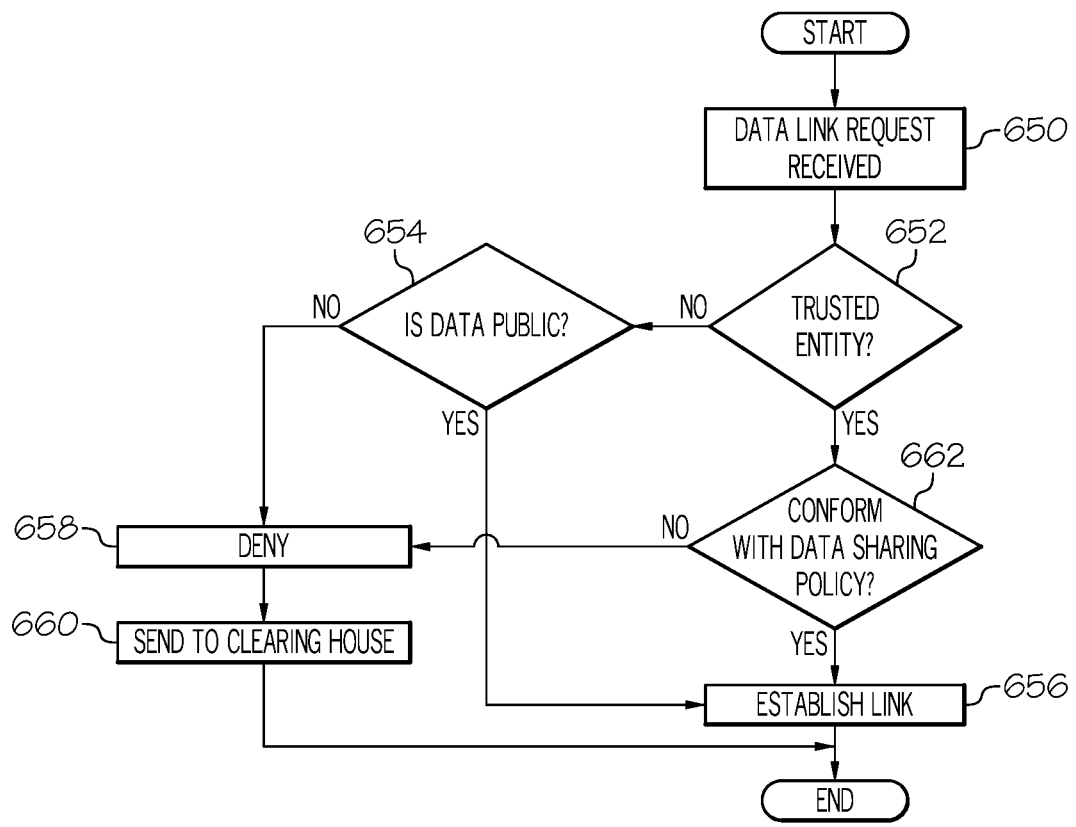
FIG. 6 depicts a flowchart for communicating data in a trusted autonomy framework.

FIG. 6 depicts a flowchart for communicating data in a trusted autonomy framework. As illustrated in block 650, the trusted autonomy framework receives a request from a data services provider to establish a trusted data link, subscribing to data available in the framework. In block 652, a determination may be made regarding whether the data request was received from a trusted entity. If not, the process proceeds to block 654, where a determination may be made regarding if the data being requested is public. It should be noted however, that some embodiments are configured such that the requested data is part of a sharing policy and block 654 may be omitted. Publicly available data is any sort of data that is permitted to be shared outside the trusted autonomy framework and may be labeled as such by the data provider. As such, if the determination at block 654 is that the data is public, a link may be established at block 656. If at block 654, the data is not public, the process proceeds to block 658 and the request is denied. At block 660, the request may be sent to the clearinghouse.

Returning to block 652, if it is determined that the request was received from a trusted entity, the process proceeds to block 662, where the trusted autonomy framework determines if the request conforms with the data sharing policy The sharing policy may evaluate information regarding who is producing the data, information about who is requesting the data, and information about the type of data being requested to determine if data is permitted to be shared. This permits third parties to readily access data that data providers provide and the permissions to view a given piece of data vary based on who requests the information. At block 656, for permitted sharing, the trusted autonomy framework established the requested datalink, permitting the requestor to receive the requested data.

Figure 7:
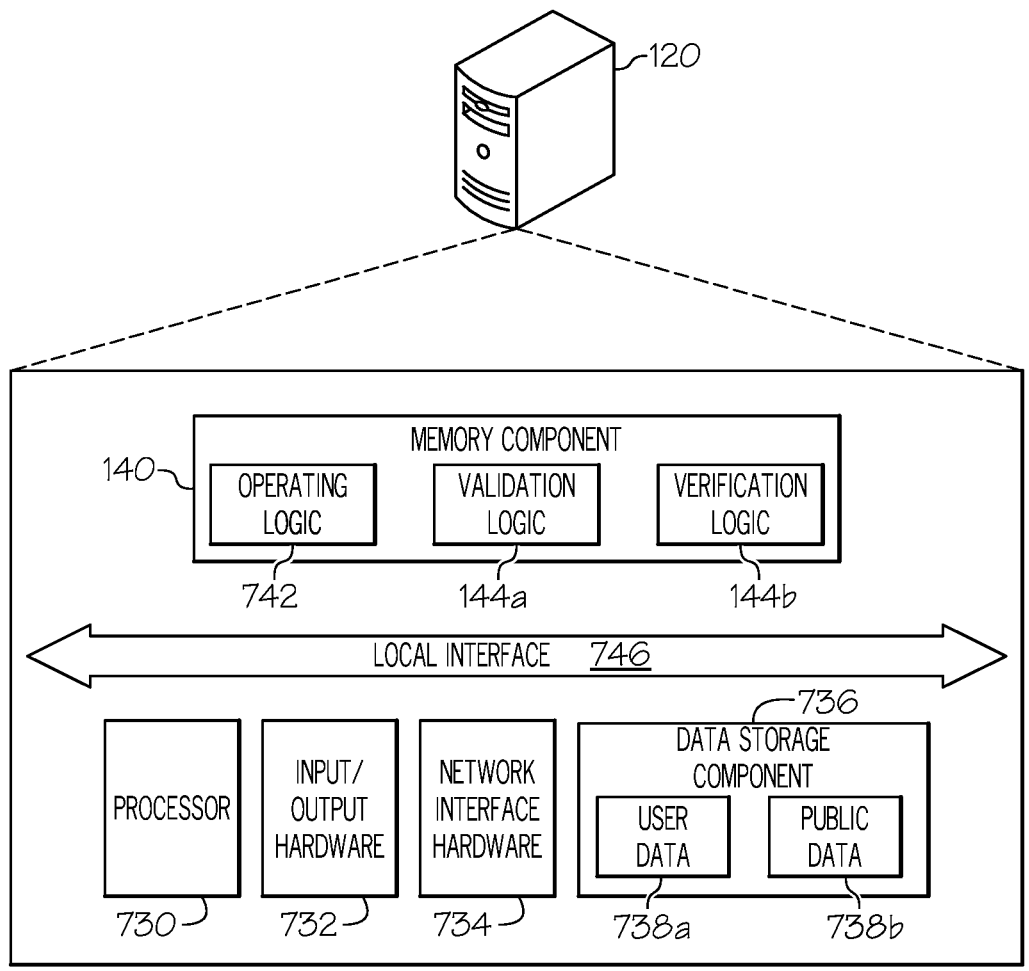
FIG. 7 depicts a computing device that may be utilized in a trusted autonomy framework, according to embodiments described herein.

FIG. 7 depicts a computing device 120 that may be utilized in a trusted autonomy framework, according to embodiments described herein. As illustrated, the computing device 120 includes a processor 730, input/output hardware 732, network interface hardware 734, a data storage component 736 (which stores trust data 738a, privilege data 738b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the clearinghouse 100 and/or external to the clearinghouse 100.

The memory component 140 may store operating system logic 742, the validation logic 144a, and the verification logic 144b. The validation logic 144a and the verification logic 144b may each include a plurality of different pieces of logic, each of which may be embodied as a computer program or module, firmware, and/or hardware, as an example. A local interface 746 is also included in FIG. 7 and may be implemented as a bus or other communication interface to facilitate communication among the components of the clearinghouse 100.

The processor 730 may include any processing component operable to receive and execute instructions (such as from a data storage component 736 and/or the memory component 140). As described above, the input/output hardware 732 may include and/or be configured to interface with the components of FIG. 7.

The network interface hardware 734 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the clearinghouse 100 and other computing devices, such as those depicted in FIG. 1.

The operating system logic 742 may include an operating system and/or other software for managing components of the clearinghouse 100. As discussed above, the validation logic 144a may reside in the memory component 140 and may be configured to cause the processor 730 to validate data being provided to the trusted network, as described above. Similarly, the verification logic 144b may be utilized to verify new entities into the trusted autonomy framework; verify existing entities in the trusted autonomy framework; and/or provide other similar functionality.

It should be understood that while the components in FIG. 7 are illustrated as residing within the clearinghouse 100, this is merely an example. In some embodiments, one or more of the components may reside external to the clearinghouse 100. It should also be understood that, while the clearinghouse 100 is illustrated as a single device, this is also merely an example. In some embodiments, the validation logic 144a and the verification logic 144b may reside on different computing devices. As another example, one or more of the functionalities and/or components described herein may be provided by a remote computing device, the user computing device, an air mobile entity, and/or other devices, which may be coupled to the clearinghouse 100 via a network connection (wired or wireless). These devices may also include hardware and/or software for performing the functionality described herein.

Additionally, while the clearinghouse 100 is illustrated with the validation logic 144a and the verification logic 144b as separate logical components, this is also an example. In some embodiments, a single piece of logic may cause the hub to provide the described functionality.

It should now be understood that the devices, systems, and methods described herein provide data sharing and protection for ancillary business data utilized by sUAS operations but is not necessarily operational data that is to be shared with the UTM. The trusted autonomy framework enables the establishment of public-private partnerships. Public entities, such as state governments or police departments can quickly and easily verify that their operational needs are met, including verifying users of the system, privacy/security standards, etc. Pricing models may also be established and validated monthly subscriptions to data services (including sending data streams to the customer, and submitting operations to the UTM/UAM on their behalf), transaction based costs. These embodiments reduce costs for establishing data agreements between parties and facilitate compliance with data agreements. Specifically, data agreements between two parties stipulate when information can be transmitted to a third party. One insight to embodiments described herein is to provide a mechanism to have the system automatically determine when information can be transmitted to a third party that is not a part of the agreement.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A method for providing a trusted autonomy framework for unmanned aerial systems comprising receiving, by a computing device, a request from an entity to participate in secure data sharing within the trusted autonomy framework for unmanned aerial systems; receiving, by the computing device, a type of data that will be shared via the entity; verifying, by the computing device, an identity of the entity, a security infrastructure of the entity; validating, by the computing device, the data to be shared is at least one of the following: accurate, authentic, or within terms of a contract; and in response to verifying, accepting, by the computing device, the entity into the trusted autonomy framework for unmanned aerial systems.

The method of any preceding clause, wherein the entity includes a small unmanned aerial system.

The method of any preceding clause, further comprising, in response to not verifying at least one of the following: the identity of the entity, the security infrastructure of the entity, or validating the data, denying, by the computing device, acceptance of the entity into the trusted autonomy framework for unmanned aerial systems.

The method of any preceding clause, further comprising receiving, by the computing device, data from a sending entity, directed for a previously accepted entity within the trusted autonomy framework for unmanned aerial systems; determining whether the sending entity is a trusted entity; and in response to determining that the data was sent from a trusted entity, accepting the data to be communicated to the previously accepted entity.

The method of any preceding clause, further comprising: validating, by the computing device, the data; and reporting, by the computing device, an accuracy statistic for the data and the sending entity for reassessing whether the sending entity should be included in the trusted autonomy framework for unmanned aerial systems.

The method of any preceding clause, further comprising in response to determining that the sending entity is not a trusted entity, determining, by the computing device, whether the data conforms with a previously established data sharing policy; in response to determining that the data conforms, accepting, by the computing device, the data to be communicated to the previously accepted entity into the trusted autonomy framework; and in response to determining that the data does not conform, denying, by the computing device, the data from being communicated to the previously accepted entity.

The method of any preceding clause, wherein the request includes information related to an agreement between the entity and an other entity for data sharing between the entity and the other entity.

A system for providing a trusted autonomy framework for unmanned aerial systems, the system comprising a computing device that includes a processor and a memory component, the memory component storing logic that, when executed by the processor causes the system to perform at least the following: receive a request from an entity to participate in secure data sharing within the trusted autonomy framework for unmanned aerial systems; receive a type of data that will be shared via the entity; verify an identity of the entity, a security infrastructure of the entity; validate the data to be shared is at least one of the following: accurate, authentic, or within terms of a contract; and in response to verifying, accept the entity into the trusted autonomy framework for unmanned aerial systems, wherein upon acceptance into the trusted autonomy framework, the entity may communicate with other entities that have been previously accepted into the trusted autonomy framework.

The system of any preceding clause, wherein the entity includes a small unmanned aerial system.

The system of any preceding clause wherein the logic further causes the system to, in response to not verifying at least one of the following: the identity of the entity, the security infrastructure of the entity, or validating the data, deny acceptance of the entity into the trusted autonomy framework for unmanned aerial systems.

The system of any preceding clause wherein the logic further causes the system to perform at least the following: receive other data from a sending entity, directed for a previously accepted entity within the trusted autonomy framework for unmanned aerial systems; determine whether the sending entity is a trusted entity; and in response to determining that the data was sent from a trusted entity, accept the data to be communicated to the previously accepted entity.

The system of any preceding clause wherein the logic further causes the system to perform at least the following: validate the data; and report an accuracy statistic for the data and the sending entity for reassessing whether the sending entity should be included in the trusted autonomy framework for unmanned aerial systems.

The system of any preceding clause wherein the logic further causes the system to perform at least the following: in response to determining that the sending entity is not a trusted entity, determine whether the data conforms with a previously established data sharing policy; in response to determining that the data conforms, accept the data to be communicated to the previously accepted entity into the trusted autonomy framework; and in response to determining that the data does not conform, deny the data from being communicated to the previously accepted entity.

The system of any preceding clause wherein the request includes information related to an agreement between the entity and an other entity for data sharing between the entity and the other entity.

The system of any preceding clause further comprising at least one of the following: the entity, wherein the entity includes a small unmanned aerial system; and an unmanned aerial system traffic management system.

A non-transitory computer-readable medium for providing a trusted autonomy framework for unmanned aerial systems, the non-transitory computer-readable medium including logic for execution by a computing device, the logic configured to cause the computing device to perform at least the following: receive a request from an entity to participate in secure data sharing within the trusted autonomy framework for unmanned aerial systems; receive a type of data that will be shared via the entity; verify an identity of the entity and a security infrastructure of the entity; and in response to verifying, accept the entity into the trusted autonomy framework for unmanned aerial systems, wherein upon acceptance into the trusted autonomy framework, the entity may communicate with other entities that have been previously accepted into the trusted autonomy framework.

The non-transitory computer-readable medium of any preceding clause, wherein the entity includes a small unmanned aerial system.

The non-transitory computer-readable medium of any preceding clause wherein the logic further causes the computing device to, in response to not verifying at least one of the following: the identity of the entity or the security infrastructure of the entity, deny acceptance of the entity into the trusted autonomy framework for unmanned aerial systems.

The non-transitory computer-readable medium of any preceding clause wherein the logic further causes the computing device to perform at least the following: receive other data from a sending entity, directed for a previously accepted entity within the trusted autonomy framework for unmanned aerial systems; determine whether the sending entity is a trusted entity; and in response to determining that the data was sent from a trusted entity, accept the data to be communicated to the previously accepted entity.

The non-transitory computer-readable medium of any preceding clause wherein the request includes information related to an agreement between the entity and an other entity for data sharing between the entity and the other entity.

What is claimed is:

1. A method for providing a trusted autonomy framework for unmanned aerial systems comprising:
    receiving, by a computing device, a request from a first entity to participate in secure data sharing within the trusted autonomy framework for unmanned aerial systems;
    receiving, by the computing device, a type of data that will be shared via the first entity;
    verifying, by the computing device, an identity of the first entity and a security infrastructure of the first entity;
    validating, by the computing device, the data to be shared is at least one of the following: accurate, authentic, or within terms of a contract;
    in response to verifying, authenticating, by the computing device, the first entity into the trusted autonomy framework for unmanned aerial systems;
    electronically receiving communication data, by the computing device, sent between the first entity and a second entity;
    determining, by the computing device, whether the first entity and the second entity are in the trusted framework;
    determining, by the computing device, that the communication data is validated; and
    in response to determining that the first entity and the second entity are in trusted framework and the communication data is validated, authenticating, by the computing device, communication of the communication data between the first entity and the second entity.

2. The method of claim 1, wherein the first entity includes a small unmanned aerial system.

3. The method of claim 1, further comprising, in response to not verifying at least one of the following: the identity of the first entity, the security infrastructure of the first entity, or validating the data, denying, by the computing device, acceptance of the first entity into the trusted autonomy framework for unmanned aerial systems.

4. The method of claim 1, further comprising:
receiving data, by the computing device, from a sending entity, directed for a previously accepted entity within the trusted autonomy framework for unmanned aerial systems;
determining, by the computing device, whether the sending entity is a trusted entity; and
in response to determining that the data was sent from a trusted entity, accepting, by the computing device, the data to be communicated to the previously accepted entity.

5. The method of claim 4, further comprising:
validating, by the computing device, the data; and
reporting, by the computing device, an accuracy statistic for the data and the sending entity for reassessing whether the sending entity should be included in the trusted autonomy framework for unmanned aerial systems.

6. The method of claim 4, further comprising:
in response to determining that the sending entity is not a trusted entity, determining, by the computing device, whether the data conforms with a previously established data sharing policy;
in response to determining that the data conforms, accepting, by the computing device, the data to be communicated to the previously accepted entity into the trusted autonomy framework; and
in response to determining that the data does not conform, denying, by the computing device, the data from being communicated to the previously accepted entity.

7. The method of claim 1, wherein the request includes information related to an agreement between the first entity and the second entity for data sharing between the first entity and the second entity.

8. A system for providing a trusted autonomy framework for unmanned aerial systems, the system comprising:
a computing device that includes a processor and a memory component, the memory component storing logic that, when executed by the processor causes the system to perform at least the following:
receive a request from a first entity to participate in secure data sharing within the trusted autonomy framework for unmanned aerial systems;
receive a type of data that will be shared via the first entity;
verify an identity of the first entity, a security infrastructure of the first entity;
validate the data to be shared is at least one of the following: accurate, authentic, or within terms of a contract;
in response to verifying, authenticate the first entity into the trusted autonomy framework for unmanned aerial systems, wherein upon acceptance into the trusted autonomy framework, the first entity may communicate with other entities that have been previously accepted into the trusted autonomy framework;
electronically receive communication data sent between the first entity and a second entity;
determine whether the first entity and the second entity are in the trusted framework;
determine that the communication data is validated; and
in response to determining that the first entity and the second entity are in trusted framework and the communication data is validated, authenticate communication of the communication data between the first entity and the second entity.

9. The system of claim 8, wherein the first entity includes a small unmanned aerial system.

10. The system of claim 8, wherein the logic further causes the system to, in response to not verifying at least one of the following: the identity of the first entity, the security infrastructure of the first entity, or validating the data, deny acceptance of the first entity into the trusted autonomy framework for unmanned aerial systems.

11. The system of claim 8, wherein the logic further causes the system to perform at least the following:
receive other data from a sending entity, directed for a previously accepted entity within the trusted autonomy framework for unmanned aerial systems;
determine whether the sending entity is a trusted entity; and
in response to determining that the data was sent from a trusted entity, accept the data to be communicated to the previously accepted entity.

12. The system of claim 11, wherein the logic further causes the system to perform at least the following:
validate the data; and
report an accuracy statistic for the data and the sending entity for reassessing whether the sending entity should be included in the trusted autonomy framework for unmanned aerial systems.

13. The system of claim 11, wherein the logic further causes the system to perform at least the following:
in response to determining that the sending entity is not a trusted entity, determine whether the data conforms with a previously established data sharing policy;
in response to determining that the data conforms, accept the data to be communicated to the previously accepted entity into the trusted autonomy framework; and
in response to determining that the data does not conform, deny the data from being communicated to the previously accepted entity.

14. The system of claim 8, wherein the request includes information related to an agreement between the first entity and the second entity for data sharing between the first entity and the second entity.

15. The system of claim 8, further comprising at least one of the following:
The first entity, wherein the first entity includes a small unmanned aerial system; and
an unmanned aerial system traffic management system.

16. A non-transitory computer-readable medium for providing a trusted autonomy framework for unmanned aerial systems, the non-transitory computer-readable medium including logic for execution by a computing device, the logic configured to cause the computing device to perform at least the following:
receive a request from a first entity to participate in secure data sharing within the trusted autonomy framework for unmanned aerial systems;
receive a type of data that will be shared via the first entity;
verify an identity of the first entity and a security infrastructure of the first entity;
in response to verifying, authenticate the first entity into the trusted autonomy framework for unmanned aerial systems, wherein upon acceptance into the trusted autonomy framework, the first entity may communicate with other entities that have been previously accepted into the trusted autonomy framework;

electronically receive communication data sent between the first entity and a second entity;

determine whether the first entity and the second entity are in the trusted framework;

determine that the communication data is validated; and in response to determining that the first entity and the second entity are in trusted framework and the communication data is validated, authenticate communication of the communication data between the first entity and the second entity.

17. The non-transitory computer-readable medium of claim 16, wherein the first entity includes a small unmanned aerial system.

18. The non-transitory computer-readable medium of claim 16, wherein the logic further causes the computing device to, in response to not verifying at least one of the following: the identity of the first entity or the security infrastructure of the first entity, deny acceptance of the first entity into the trusted autonomy framework for unmanned aerial systems.

19. The non-transitory computer-readable medium of claim 16, wherein the logic further causes the computing device to perform at least the following:

receive other data from a sending entity, directed for a previously accepted entity within the trusted autonomy framework for unmanned aerial systems;

determine whether the sending entity is a trusted entity; and in response to determining that the data was sent from a trusted entity, accept the data to be communicated to the previously accepted entity.

20. The non-transitory computer-readable medium of claim 16, wherein the request includes information related to an agreement between the first entity and the second entity for data sharing between the first entity and the second entity.

* * * * *